(12) United States Patent
Higgins et al.

(10) Patent No.: US 7,967,894 B1
(45) Date of Patent: Jun. 28, 2011

(54) SYSTEM AND METHOD FOR IMPROVED MERCURY CONTROL

(75) Inventors: Brian S. Higgins, Walnut Creek, CA (US); Klaus Oehr, Surrey (CA)

(73) Assignee: Nalco Mobotec, Inc., Naperville, IL (US)

( * ) Notice: Subject to any disclaimer, the term of this patent is extended or adjusted under 35 U.S.C. 154(b) by 262 days.

(21) Appl. No.: 12/348,615

(22) Filed: Jan. 5, 2009

Related U.S. Application Data

(62) Division of application No. 11/389,877, filed on Mar. 27, 2006, now Pat. No. 7,473,303.

(51) Int. Cl.
*B01D 53/02* (2006.01)
*B01D 53/64* (2006.01)

(52) U.S. Cl. .............. 95/134; 95/234; 95/285; 210/688; 55/524

(58) Field of Classification Search ................ 95/43–45, 95/107, 134, 234, 285; 210/660, 688, 754; 55/524; 423/210; 110/345, 203, 216
See application file for complete search history.

(56) References Cited

U.S. PATENT DOCUMENTS

| | | | | |
|---|---|---|---|---|
| 4,039,446 A * | 8/1977 | Ban et al. | | 210/688 |
| 4,139,354 A * | 2/1979 | Giles | | 96/135 |
| 4,591,490 A * | 5/1986 | Horton | | 423/210 |
| 5,391,217 A * | 2/1995 | Zoche | | 75/724 |
| 5,558,771 A * | 9/1996 | Hagen et al. | | 210/500.25 |
| 5,695,726 A * | 12/1997 | Lerner | | 423/210 |
| 5,845,173 A | 12/1998 | Zogg et al. | | 399/90 |
| 6,129,843 A * | 10/2000 | Petty et al. | | 210/321.78 |
| 6,398,039 B1 | 6/2002 | Xue et al. | | 210/504 |
| 6,527,828 B2 | 3/2003 | Flippo et al. | | 95/54 |
| 6,818,043 B1 | 11/2004 | Chang et al. | | 95/37 |
| 6,953,494 B2 | 10/2005 | Nelson, Jr. | | 95/134 |
| 7,442,352 B2 * | 10/2008 | Lu et al. | | 423/210 |
| 7,479,263 B2 * | 1/2009 | Chang et al. | | 423/210 |
| 2003/0110948 A1 | 6/2003 | Gaita et al. | | 96/108 |
| 2004/0045437 A1 | 3/2004 | Chang et al. | | 95/134 |
| 2004/0081606 A1* | 4/2004 | Cooper et al. | | 423/210 |
| 2005/0000901 A1 | 1/2005 | Campbell et al. | | 210/660 |

FOREIGN PATENT DOCUMENTS

JP 62-155926 A * 7/1987

OTHER PUBLICATIONS

Desalination, 95 (1994) 325-345; The search for a chlorine-resistant reverse osmosis membrane; J. Glater, S-k Hong, M. Elimeleach.
Journal of Applied Polymer Science, vol. 77, 1387-1392 (2000); Preparation and Properties of Aromatic Polyamide Homologs Containing Chlorine Substituents; S. Kang, S. Jong C. Park.
Macromol. Chem. Phys. 2001, 2002, No. 16, 3142-3148; Thermal and Mechanical Porperties of Halogen-Containing Aromatic Polymaides; J. Alvarez, J. de la Campa, A. de Abajo.

* cited by examiner

*Primary Examiner* — Frank M Lawrence
(74) *Attorney, Agent, or Firm* — MacCord Mason PLLC

(57) ABSTRACT

A combustion system having improved mercury collection. The system includes a combustion chamber for burning a fuel containing mercury, whereby burning produces a flue gas stream containing mercury and a device for removing mercury from the flue gas stream. The device includes a thermopolymer substrate; and a mercury-receptor attached to the substrate. In one embodiment, the system may further include a collector downstream of the device for collecting the mercury attached to the thermopolymer. The inventions further include alternative methods of mercury removal and preparation of the polymer substrate.

33 Claims, 7 Drawing Sheets

Where:  R = O, SO₂ or C(CF₃)₂
X = Cl or Br or I
Hg = mercury

Where:  R = O, SO₂ or C(CF₃)₂
X = Cl or Br or I
Hg = mercury

SYSTEM AND METHOD FOR IMPROVED MERCURY CONTROL

This application is a divisional of U.S. application Ser. No. 11/389,877, filed on 27 Mar. 2006 and now issued as U.S. Pat. No. 7,473,303.

BACKGROUND OF THE INVENTION (1) Field of the Invention

The present method relates generally to mercury capture from gases, for example mercury capture from flue gases formed during combustion, such as coal combustion, and, in particular, to a new and useful system and method for capturing mercury using at least partially halogenated polymers such as halogenated polyamides.

(2) Description of the Prior Art

The burning of fossil fuels is estimated to release thousands of tons of mercury into the environment every year. Because of the toxicity of mercury, efforts are being made to reduce its release.

On Mar. 16, 2005, the United States Environmental Protection Agency (EPA) drafted its "Clean Air Mercury Rule" which required mercury reduction for existing and new coal-fired electrical power plants. This legislation on average required more stringent mercury reduction for bituminous coal fired power plants in the 28 most eastern states of the United States. The 7 states most impacted by the draft legislation follow:

| United States Statewide Mercury Mass Balance 1999 | | | | | | | | |
|---|---|---|---|---|---|---|---|---|
| State | lbs $Hg_p$ | lbs $Hg_x$ | lbs $Hg_o$ | lbs $Hg_T$ | Tons $Hg_T$ | EPA 2010 Tons $Hg_T$ | Reduction EPA 2010 % | EPA 2018 Tons $Hg_T$ | Reduction EPA 2018 % |
| Pennsylvania | 590.40 | 5974.00 | 3394.20 | 9958.60 | 4.979 | 1.78 | 64% | 0.702 | 86% |
| Maine | 0.25 | 2.78 | 1.05 | 4.07 | 0.002 | 0.001 | 51% | 0.001 | 51% |
| Alabama | 170.92 | 2316.20 | 2440.20 | 4931.32 | 2.466 | 1.289 | 48% | 0.509 | 79% |
| Illinois | 70.34 | 2142.60 | 3776.20 | 5989.14 | 2.995 | 1.594 | 47% | 0.629 | 79% |
| Maryland | 97.50 | 1111.20 | 611.40 | 1820.10 | 0.910 | 0.49 | 46% | 0.193 | 79% |
| West Virginia | 266.20 | 3004.60 | 1661.00 | 4931.80 | 2.466 | 1.394 | 43% | 0.550 | 78% |
| Ohio | 314.20 | 3620.20 | 3174.60 | 7109.00 | 3.555 | 2.057 | 42% | 0.812 | 77% |

Other states including New Jersey, Wisconsin, Massachusetts, Connecticut, Illinois, Michigan and New Hampshire have passed their own more stringent emission regulations for coal-fired power plants. It is known that flue gas desulphurization systems (FGDs) have the ability to capture about 63% and 87% of incoming total mercury ($Hg_T$) and oxidized mercury ($Hg_X$), respectively. Also, NOx controls systems such as selective catalytic reduction systems (SCRs) have shown some promise in reducing mercury emissions by catalytically oxidizing a portion of elemental mercury ($Hg_o$) to oxidized mercury ($Hg_X$) that is more easily adsorbable by either certain types of fly ash or FGDs. However FGDs and SCRs are expensive and uneconomical for all but the largest power plants (e.g., 500 MWe or larger). The average size of American coal-fired power plants is about 275 MWe. Therefore there is a need to find non-FGD and/or non-SCR techniques for removing mercury from flue gas, especially in smaller coal-fired electric power plants (e.g., below 500 MWe capacity).

It is well known that halogenated activated carbon is suitable for use in adsorbing mercury from a flue gas including coal combustion flue gas. For instance, U.S. Pat. No. 6,953,494 to Nelson describes the use of halogenated carbonaceous sorbents, for example brominated powdered activated carbon for use in mercury removal from flue gas. One disadvantage of this technology is that some of the halogen-to-carbon bonds are weak, allowing halogen desorption from the carbonaceous material. For instance, activated carbons impregnated with iodine and iodine compounds are released from carbonaceous sorbents at moderately elevated temperatures. Thus, their use is largely limited to ambient temperature process streams (page 2, lines 30 to 33). Iodine compounds are primarily or only physically adsorbed on carbonaceous materials. (page 2, lines 37 to 39). Carbonaceous materials will both physically adsorb bromine species ($Br_2$ and HBr) and chemically react with them. Physically adsorbed bromine is prone to desorb from the materials upon changed conditions such as injection into a hotter gas stream for example (page 8, lines 22 to 28). Brominating to 15 wt. % $Br_2$ generally produces even more capable mercury sorbent, but as some of the bromine is held at less energetic sites, there is a greater possibility that some degree of bromine may evolve off under some circumstances (page 2, lines 50 to 54).

Further, the burning of fossil fuels is not the only source of mercury being introduced into the environment. For example, mercury, e.g., metallic mercury, is used extensively in a variety of industries, including many electrical, manufacturing and chemical industries.

Regardless of the source of the mercury, because of limited containment and recycling techniques, much of it ends up as environmental pollutant. Any amount of mercury in the environment causes concern because it may harm organisms and may accumulate in the human food supply. For example, methylmercury, which is lipophilic and highly toxic, is a common result of mercury being released into the environment. Because of its lipophilicity, it accumulates rapidly in the food chain. Further, because of its methyl group, methylmercury may be gaseous, and thus easily inhaled.

Thus, there is a need for reducing the release of mercury into the environment, as well as, to protect people from mercury that has already been released. More particularly, there is a need for techniques and products to help fossil fuel power plants comply with EPA standards, as well as, to prevent harm to organisms, including humans, and the environment by a new and improved system and method of mercury control.

SUMMARY OF THE INVENTION

The present invention is directed to a combustion system having improved mercury collection. The system includes a combustion chamber for burning a fuel containing mercury, whereby burning produces a flue gas stream containing mercury, and a device for removing mercury from the flue gas stream. The device includes a thermopolymer substrate; and a mercury-receptor attached to the substrate. In the preferred embodiment, the system may further include a collector downstream of the device for collecting the mercury attached to the thermopolymer.

In the preferred embodiment, the combustion system is a fossil fuel steam generator. It may further include at least one steam turbine connected to the steam generator. In addition, it may also further include at least one electrical generator connected to the steam turbine for producing electricity.

In the device for mercury-removal, the polymer substrate preferably is an aromatic polymer. In one embodiment, the polymer is a polyamide. In another embodiment, the polymer is a polysulfone. Still, in many embodiments, the device is an aromatic polyamide or aromatic polysulfone. Also, preferably, the mercury-receptor is a halogen. The mercury-receptor may be selected from the group consisting of chlorine, bromine, and iodine. The device may also include a heater for heating the substrate or a fluid.

Also, in the device for mercury-removal, in one embodiment, the polymer substrate preferably is a fiber. In another embodiment, the substrate is formed into a membrane. In still another embodiment, the substrate is a particle, such as a bead.

The substrate may be an electrically conductive composite. For example, the composite may include graphite. Alternatively, the substrate may contain substitutions to increase conductivity.

The composite may also contain a sulphonate functionality in the polymer or in a copolymer. For example, the sulphonate may be bonded to a conductive cation. In one preferred embodiment, the conductive cation is selected from the group consisting of sodium, potassium, ammonium, magnesium and calcium.

In one embodiment, the collector is an electrostatic precipitator. In another embodiment, the collector is a bag house.

Accordingly, one aspect of the present invention is to provide a combustion system having improved mercury collection, the system comprising: (a) a combustion chamber for burning a fuel containing mercury, whereby burning produces a flue gas stream containing mercury; and (b) a thermopolymer for removing mercury from the flue gas stream.

Another aspect of the present invention is to provide a device for mercury-removal from a fluid, the device comprising: (a) a polymer substrate; and (b) a mercury-receptor attached to the substrate.

Still another aspect of the present invention is to provide a combustion system having improved mercury collection, the system comprising: (a) a combustion chamber for burning a fuel containing mercury, whereby burning produces a flue gas stream containing mercury; (b) a device for removing mercury from the flue gas stream, the device including: (i) a thermopolymer substrate; and (ii) a mercury-receptor attached to the substrate; and (c) a collector downstream of the device for collecting the mercury attached to the thermopolymer.

Still another aspect of the present invention is to provide a method of mercury removal method comprising the steps of: burning a fuel containing mercury in a combustion chamber, whereby burning produces a flue gas stream containing mercury; and removing mercury from the flue gas stream by contacting the flue gas stream with a thermopolymer.

Still another aspect of the present invention is to provide a method of mercury removal comprising the step of: contacting the fluid containing mercury with a polymer having a mercury-receptor.

Still another aspect of the present invention is to provide a method of mercury removal comprising the steps of: burning a fuel containing mercury in a combustion chamber, whereby burning produces a flue gas stream containing mercury; removing mercury from the flue gas stream by contacting the flue gas stream with a device including: (i) a thermopolymer substrate; and (ii) a mercury-receptor attached to the substrate; and collecting the mercury attached to the thermopolymer.

Still another aspect of the present invention is to provide a method of removing mercury from a fluid, the method comprising the steps of: (a) heating a polymer membrane; (b) exposing the heated membrane to a mercury-receptor; (c) cooling the exposed polymer membrane; and (d) contacting the polymer with a mercury containing fluid.

These and other aspects of the present invention will become apparent to those skilled in the art after a reading of the following description of the preferred embodiment when considered with the drawings.

DESCRIPTION OF THE PREFERRED EMBODIMENTS

Figure 1:
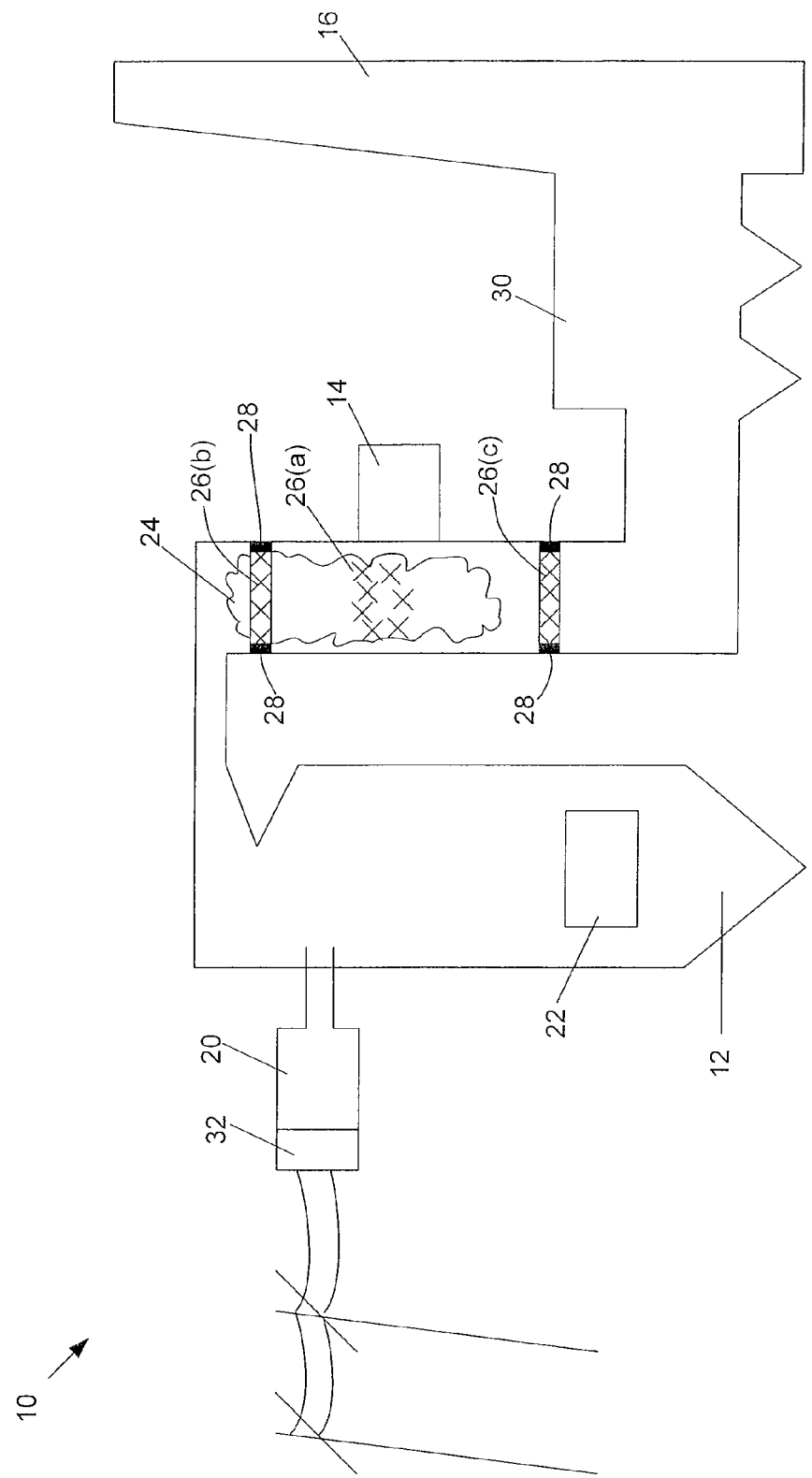
FIG. 1 is a schematic diagram of one embodiment of a combustion system constructed according to the present invention.

In the following description, like reference characters designate like or corresponding parts throughout the several views. Also in the following description, it is to be understood that such terms as "forward," "rearward," "left," "right," "upwardly," "downwardly," and the like are words of convenience and are not to be construed as limiting terms.

Referring now to the drawings in general and FIG. 1 in particular, it will be understood that the illustrations are for the purpose of describing a preferred embodiment of the invention and are not intended to limit the invention thereto. As best seen in FIG. 1, a combustion system for mercury control, generally designated 10, is shown constructed according to the present invention. Those skilled in the art will recognize that a variety of combustion systems may be considered within the scope of the present invention. For example, the combustion system may be a fossil fuel steam generator, such as peat, anthracite, petroleum, coke, bitumen, lignite, subbituminous coal, or bituminous coal fired power plants, or a variety of other combustion-based plants. Similarly, combustion system 10 may encompass incinerators for waste removal, such as incinerators used by, for example, municipal-waste disposal facilities, hazardous-waste disposal facilities, hospitals, dental offices or research institutions.

System 10 includes a combustion chamber 12, which in some embodiments may be a boiler. Thermopolymer injector 14 and stack 16 are located downstream of combustion chamber 12. While thermopolymer injector 14 is depicted at a particular location, this depiction is for illustrative purposes only. The only positional limitation of thermopolymer injector 14 is that it is located some point downstream from the beginning of combustion chamber 12. Additionally, in some embodiments, such as fossil fuel steam generators, system 10 may also include at least one steam turbine 20 connected to an electric generator 32.

Combustion chamber 12 is used to burn fuel 22, or some other material, which in many instances, may contain mercury in any number of forms, such as $Hg_0$ (elemental), $Hg_X$ (oxidized), or $Hg_p$ (particulate). When in use, combustion chamber 12 produces a flue gas 24, which may also contain mercury, in any number of forms as well. Injector 14 is configured to inject a thermopolymer 26 having a mercury-receptor into the flue gas 24, thereby removing the mercury from the combustion flue gas stream.

System 10 may also include a collector 30 downstream of the thermopolymer for collecting the thermopolymer with attached mercury. Those skilled in the art will recognize that a variety of collection techniques may be used. For example, the collector may be any number of electrostatic precipitators (ESP), bag houses (BH), fabric filters (FF), wet scrubbers, flue gas desulphurization (FGD) systems, selective catalytic reduction (SCR) systems, or mechanical dust collectors. Similarly, any of the above mentioned collectors in combination may be considered within the scope of the present invention. Similarly, the collector may be a molten collector, such as, for example, a molten polymer wet scrubber, wherein flue gas is bubbled through the molten polymer.

A variety of thermopolymers may be used to achieve the present invention. Preferably, thermopolymers are polymers able to resist thermal decay up to and including temperatures at least as high as the collector downstream of the polymer. For example, collector temperature may be in between about 65° C. and 150° C., while some embodiments of the thermopolymer of the present invention exhibit thermostability at temperatures in between about 400° C. and 560° C. For example, the thermopolymers may be aromatic polyamides, such as, for example, NOMEX® manufactured by DUPONT. Additionally, a variety of mercury-receptors could be combined with the thermopolymer. Preferably, the mercury-receptor is a halogen, e.g., for example, fluorine, chlorine, bromine, or iodine. Even more preferably, the mercury-receptor is chlorine or bromine. Those skilled in the art will recognize that a variety of techniques may be used to attach halogens to polyamides.

For example, Glater et al. 1994. *The search for a chlorine-resistant reverse osmosis membrane*. Desalination. 95:325-345, describe the in-situ halogenation of an unhalogenated polyamide, e.g. chlorination of reverse osmosis membranes during desalination via chlorinated feed-water.

Additionally, the halogenated polyamides have been formed from monomers containing a halogen functional group. For example, Alvarez et al. 2001. *Thermal and mechanical properties of halogen containing aromatic polyamides*. Macromolecular Chemistry and Physics. 202:3142-3148, described the formation of halogenated polymers having the following structure (2):

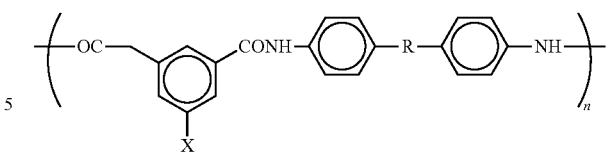

Where:
$R=O$, $SO_2$ or $C(CF_3)_2$
$X=H$, F, Cl, Br, I

Such halogenated polyamides were shown to resist thermal decomposition at temperatures $\leq 400°$ C. Similarly, Kang et al. 2000. *Preparation and properties of aromatic polyamide homologs containing substituents*. Journal of Applied Polymer Science. 77:1387-1392, describe the formation of chlorinated polyamides from monomers containing a chlorine functional group having the following structure (3):

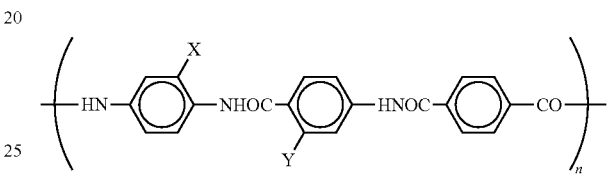

Where X, Y are H or Cl species. They showed that that for $X=Cl$ and $Y=H$ or $X=H$, $Y=Cl$, the polyamides resisted thermal decomposition below 567° C.

Preferably, the thermopolymer is formed as a particle, such as a bead 26(a), that may be injected by injector 14. The present invention may be achieved using a variety of bead sizes. Preferably beads 26(a) will be sized for collection by collector 30, and may be, for example, a porous microbead. For example, if collector is a bag, beads 26(a) should be sized to fit into the bag, yet not pass through the bag. In such an embodiment, thermopolymer beads may range in size from a micron to several millimeters in diameter, for example bead diameter may be in between about 1 μm and 1000 μm, more preferably, bead diameter may be in between about 10 μm and 200 μm, and even more preferably still, bead diameter may be in between about 15 μm and 100 μm. Injection of the thermopolymer may also include injection in liquid, aerosol or gaseous phase.

In other collector embodiments, such as electrostatic precipitators, because of the different mechanism of collection, a different size bead may be preferred. For example, bead diameter may be in between about 4 μm and 1500 μm, more preferably, bead diameter may be in between about 15 μm and 300 μm, and even more preferably still, bead diameter may be in between about 20 μm and 150 μm.

Still, many may desire to use two or more different type of collection systems in combination, and in such circumstances, preferably bead diameter may be modified as appropriate, for example, as desired to increase collection.

Additionally, some may wish to achieve the present invention without injector 14 and beads 26(a) simply by using thermopolymer filter 26(b). Filter 26(b) may be mounted through mounts 28 for orienting the filter to allow flue gas passage. Many may, however, desire to achieve the present invention using both beads 26(a) and filter 26(b), which would be within the scope of the present invention. Further, some may even desire to use multiple thermopolymer filters, such as filter 26(c) depicted in FIG. 1. If multiple filters are used in combination with injector 14 and beads 26(a), filters may either be positioned upstream of injector 14, e.g. filter 26(b), or, if downstream, e.g. filter 26(c), be configured to allow the passage of beads 26(a).

The present invention also includes a device for mercury-removal from a fluid. The device is applicable to any fluid, including liquids, gases, vapors and aerosols, yet certain embodiments may be more effective with certain types of fluids. The device may be used for any number of applications, and may be preferably used, in some embodiments, for a combustion system, such as depicted in FIG. 1. In such embodiments, the device may further include an injector, e.g. injector 14 of FIG. 1, for example, for injecting beads, or may include, in other filter embodiments, a mount, e.g. mounts 28 of FIG. 1, for orienting the filter to allow flue gas passage. Still, many may prefer to use other embodiments of the present invention.

Figure 2:
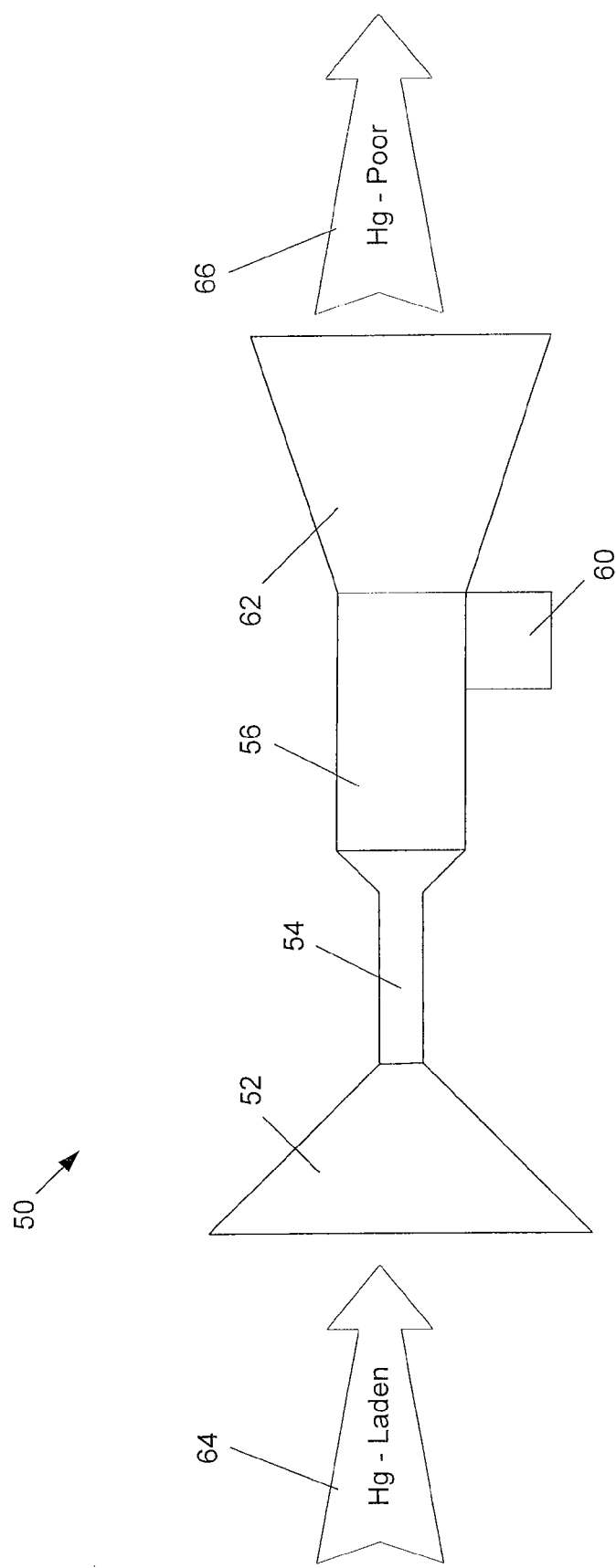
FIG. 2 shows one embodiment of a device of the present invention.

FIG. 2 shows one embodiment of the device 50 of the present invention. Device 50 is a filtration device, which may be an ambient air filtration device. The use of such a device may be ideal to filter mercury from contaminated air, such as dental offices, where drilling or processing silver amalgam tooth fillings contaminates the air with mercury.

Device 50 includes vacuum 54, which pulls air though intake 52. Polymer substrate 56, with attached mercury receptor (not visible), is in communication with intake 52. Substrate 56 is preferably a halogenated polyamide or aromatic polyamide containing chlorine, bromine or iodine. Preferably, in such embodiments, the substrate is in the form of a filter, e.g. a porous disposable or recyclable foam or membrane or bed of particulate.

Heater 60 heats substrate 56. Those skilled in the art will recognize that a variety of heaters may be used to achieve the present invention. For example, suitable heaters may include heating elements adjacent to substrate 56, or hot air injectors for injecting hot air onto substrate 56. The ability to heat the filter may allow for the optimization of mercury removal. For example, various polymers and various mercury receptors may perform differently over different temperature ranges. A heater may allow users to adjust temperature to optimize mercury removal dependant on such variables. In other embodiments, heaters may be used to heat the fluid rather than the substrate. Still, applicants predict that filtering without the heater will be successful, and some may prefer such embodiments.

Device 50 also includes air output 62 for exhausting air.

In operation, heater 60 heats substrate 56 to the optimum temperature. Vacuum 54 pulls mercury-laden air 64 through intake 52. As air 64 travels through substrate 56, mercury receptors (not visible) trap mercury. Mercury-poor air 66 is exhausted.

Still others, may prefer to use different embodiments of the device, or use the device for different functions, such as for example, for capturing mercury produced through certain mercury-based amalgamation processes, e.g. gold or silver amalgamation, or for mercury removal from gold smelting.

Figure 3:
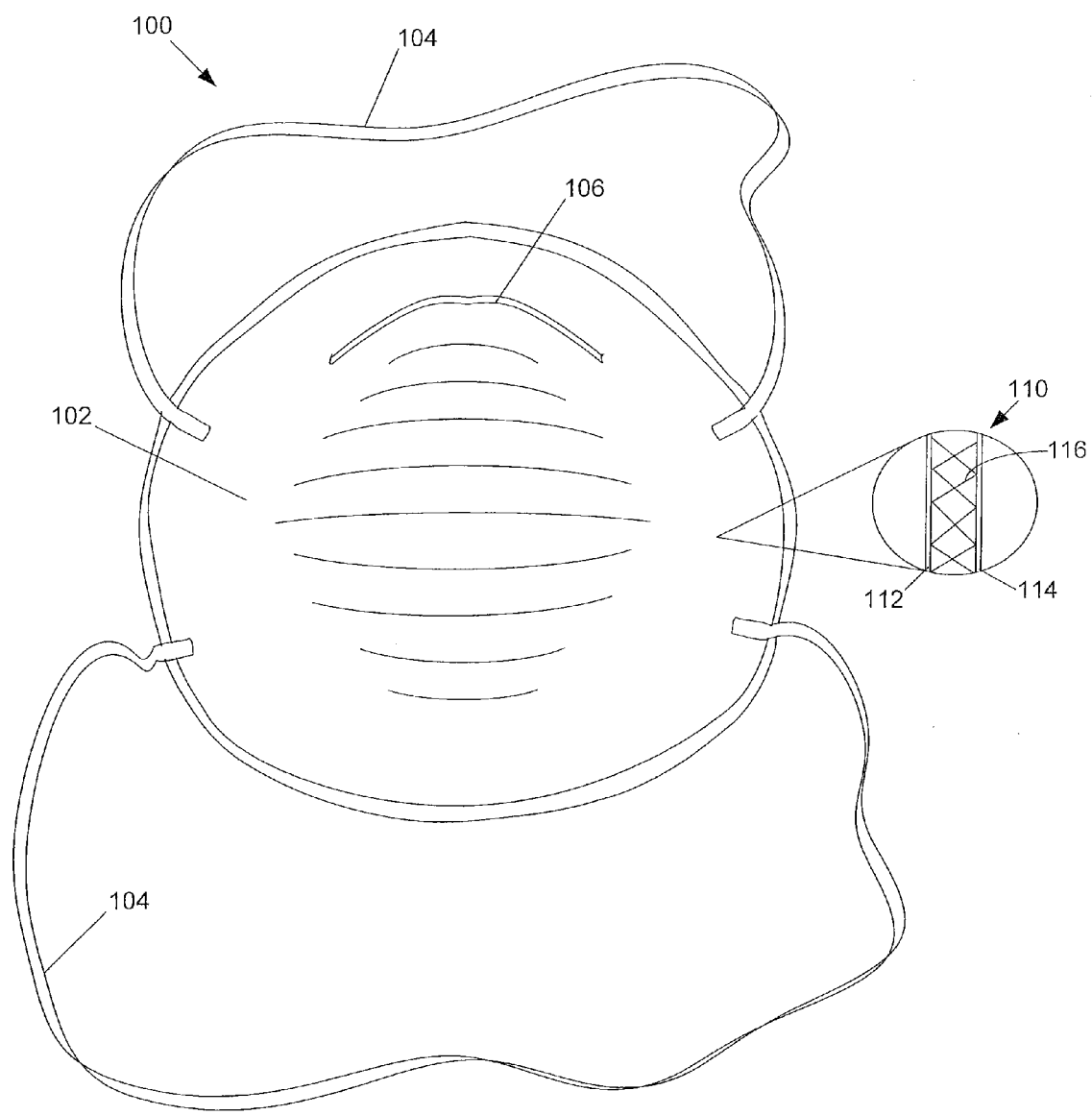
FIG. 3 shows another embodiment of a device of the present invention.

FIG. 3 shows another embodiment of the device of the present invention. In this embodiment, the device includes a facemask filter 100 for mercury removal. The device could similarly comprise any number of devices, e.g. any number of filters for example, water filters or other combustion exhaust filters, or may comprise particles, e.g. porous "microbeads" captureable by polyamide or non-polyamide baghouse membranes for use in combustion systems.

Facemask 100 includes a filtering-material 102, head-straps 104 and mask-support 106. Cutaway 110 shows a cross-sectional view of material 102. Cutaway 110 shows front surface 112 of material 102, which may be considered the point of contaminated air intake, and back surface 114 of material 102, which may be considered the point of exhaust.

Polymer substrate 116 is shown positioned in-between front surface 112 and back surface 114. The polymer substrate can be utilized in a variety of forms, and may be preferably in a particulate form, such as a bead form. Still, the polymer may be in a variety of fiber forms, and may be, for example, woven, non-woven, membrane, knit or composite. Depending on the form of the substrate, or other factors, front surface 112 and back surface 114 may not be needed.

A variety of polymer substrates could be used to achieve the present invention. For example, the polymer could be a polyamide or polysulfone. In some embodiments, for example, in embodiments that will be exposed to high temperatures, for example, the thermopolymer depicted in FIG. 1, it may be preferable that the polymer is an aromatic polymer, e.g. the aromatic polyamide NOMEX®.

Figure 4A:
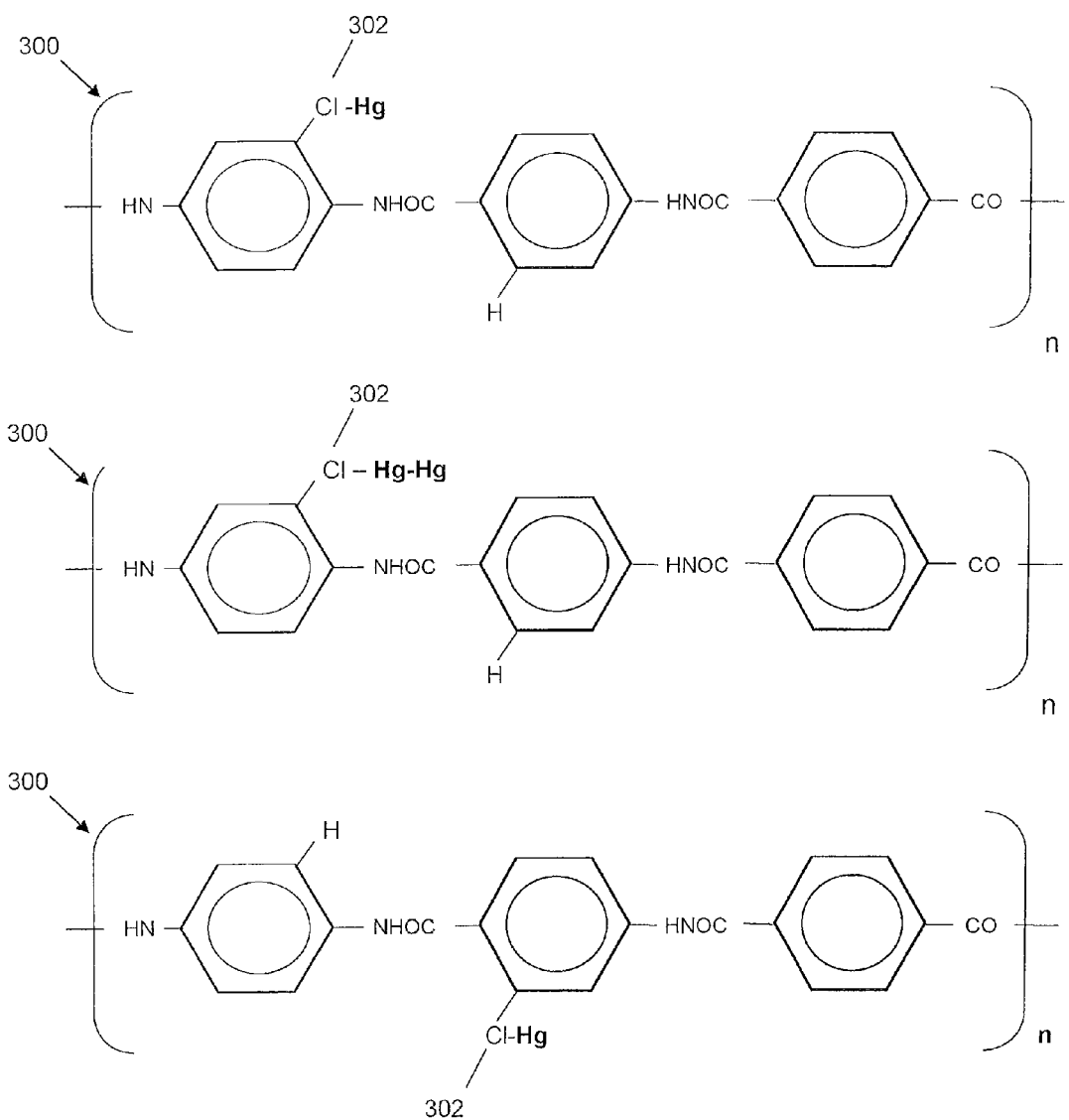
FIGS. 4(a), 4(b) and 4(c) show embodiments of the polymer of the present invention.
Figure 4B:
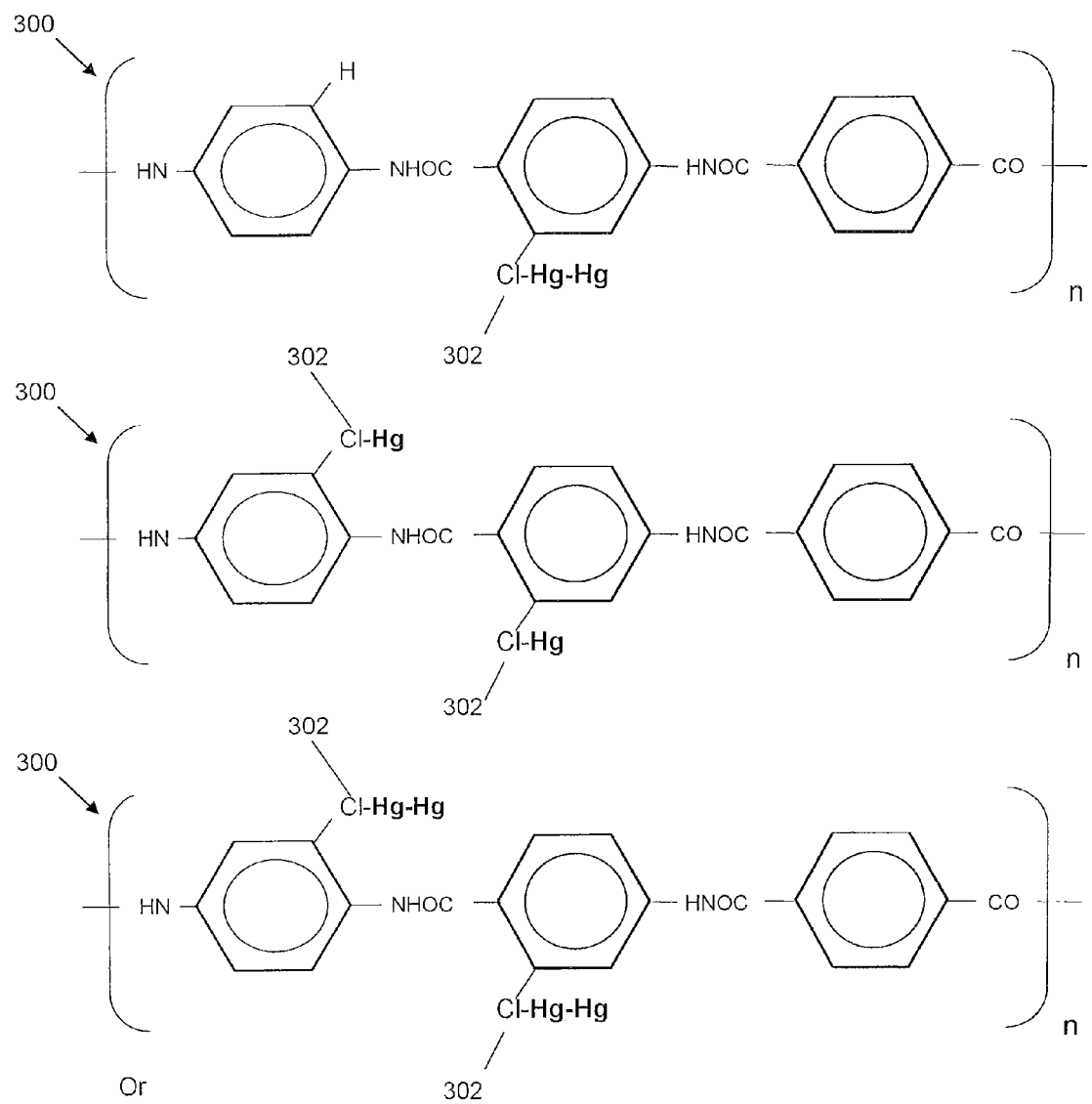
Figure 4C:
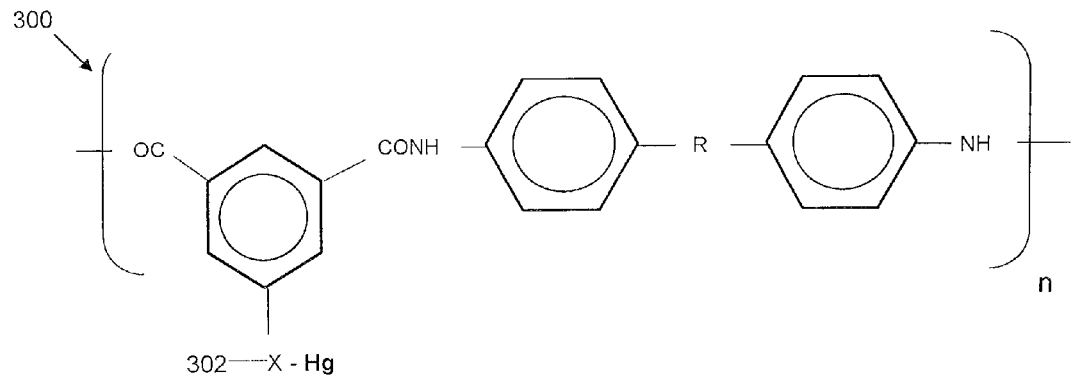
Figure 4C:
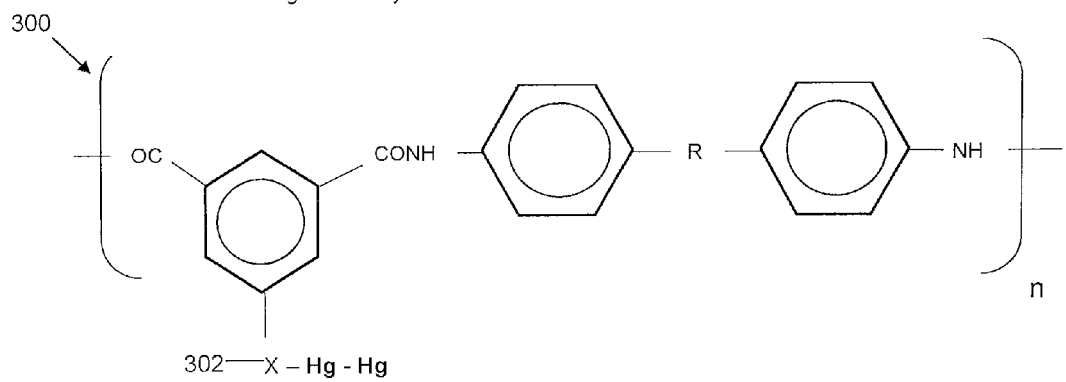

FIGS. 4(a), 4(b) and 4(c) show various embodiments of polymers 300 of the present invention. Polymers 300 also have an attached mercury receptor 302, and may have numerous mercury receptors. Preferably, the mercury receptor is a halogen, and more preferably, is selected from the group consisting of chlorine, bromine, and iodine. Polymers 300 may be created, for example, by reacting a halogenated monomer with another monomer, similar to techniques described above by Alvarez et al. or Kang et al.

The device may also be electrically conductive. Conductivity may be important for some embodiments, and, in particular, conductivity may be important for embodiments to be used with electrostatic precipitators of combustion systems, e.g. the combustion system of FIG. 1.

Conductivity may be achieved by the inherent conductivity of the substrate itself, or may be augmented by other means. For example, conductivity may be enhanced by forming the device as a composite, for example, a graphite composite. Still others may prefer other composites, which are all within the scope of the present invention.

In addition to enhancement through composite formation, conductivity may be enhanced through other mechanisms. For example, the device may contain substrate substitutions to increase conductivity. By way of example, the device may contain a sulphonate functionality in the polymer or in a copolymer. Applicants prefer to achieve such functionality by bonding the sulphonate to a conductive cation, yet others may prefer other mechanisms. Preferably, the conductive cation is sodium, potassium, ammonium, magnesium or calcium.

Referring back to device 100, mercury removal may be achieved by contacting a mercury containing fluid with the polymer having a mercury-receptor. For device embodiments, preferably the fluid is a gas, vapor or aerosol, yet applicants predict that the device as shown, or in other embodiments, will remove mercury from other fluids, e.g. liquids, including, for example, mercury contaminated water.

Still other embodiments of the device may be used to remove mercury from other fluids, such a flue gas, specifically fossil fuel combustion flue gas, or from other combustion streams. All such variations are within the scope of the present invention.

For certain embodiments, e.g. certain membranes, bag houses, filters, water filters, air filters, or aerosol or vapor filters, applicants prefer to contact the fluid with the device by passing the fluid through the device, such as, for example, by directing a fluid through a membrane. Still, for other embodiments, e.g. other bead, liquid, or gas embodiments, applicants prefer to contact the fluid with the device by injecting the device into fluid, such as, for example, by injecting beads into a flue gas.

For some embodiments of polymers used for the combustion system shown in FIG. 1 and the devices shown in FIG. 2 and FIG. 3, applicants prefer to produce polymers having mercury receptors by combining monomers having mercury receptors. In other embodiments, however, others may prefer to manufacture polymers having a mercury-receptor in-situ by exposing the polymer to a gaseous mercury-receptor. Similarly, such polymers may also be manufactured in-situ by exposing the polymer to a mercury-receptor in solution.

For example, a polymer may have a mercury receptor added in-situ and then used to remove mercury froth a fluid, such as any of the variety of fluids previously described, and in particular, such as a gas, which may be a combustion flue gas.

In such an embodiment of the present invention, a polymer membrane may be heated. Heating may be achieved by any of the techniques available to those of ordinary skill in the art. In certain embodiments, of the invention, such as the combustion system embodiments, heating may be achieved simply by placing the polymer membrane downstream of a combustion zone, thereby allowing the heat produced by combustion to provide the requisite heating. Preferably the heating is to above the dew point temperature of the membrane, yet heating in between about 24° C. and 90° C., may be used to achieve satisfactory results, depending on the embodiment.

The currently described method also involves exposing the heated membrane to a mercury-receptor. The exposing may be achieved by exposing the heated membrane to a gas including a mercury-receptor. A variety of gases may be used to achieve the present invention, e.g. a gas containing some form of chlorine, or a chlorine gas, or a gas containing some form of bromine, or a bromine gas, for example. The exposing may also be achieved by exposing the heated membrane to a liquid including a mercury-receptor, such as for example, a liquid containing some form of a halogen.

Not to be limited to any mechanism in particular, exposing allows, for example in the case of polyamide embodiments of the present invention, the mercury receptor to react with the nitrogen of the polymer. For example, if bromine gas was used, the bromine would react with the nitrogen as follows:

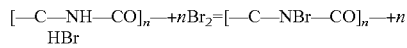
HBr

The method also includes cooling the exposed polymer membrane. Preferably, the polymer membrane is cooled to below the dew point temperature of the membrane, yet in other embodiments cooling to various degrees may achieve satisfactory results. Additionally, cooling may be achieved by a variety of means. For example, cooling may be passive, such as by allowing the membrane to cool by ambient air. Additionally, cooling may be active, such as by adding or injecting water or air to the membrane. All such embodiments are within the scope of the present invention.

Referring back to the previously described example, and again, intending to teach rather than limit the present invention to any particular mechanism, as the membrane is cooled, moisture condenses from the atmosphere, as in passive cooling techniques, or is added, as in some active cooling techniques and dissolves the bromine off nitrogen in the form of HOBr. The HOBr then reacts with the a carbon and brominates the polymer. For example:

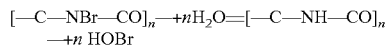

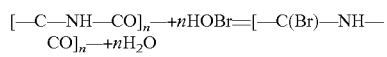

The method also includes the contacting the polymer with a mercury containing fluid, which may include, for example, passing the fluid through a membrane.

Another example of a proposed mechanism for in-situ embodiments of the present invention, which is not intended to limit the invention to any particular mechanism, for mercury capture by, for example, a NOMEX® membrane having a mercury-receptor is suggested as follows:

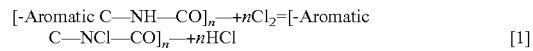 [1]

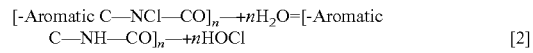 [2]

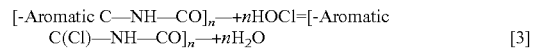 [3]

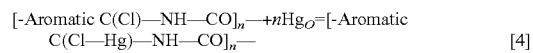 [4]

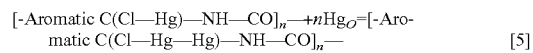 [5]

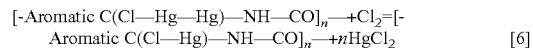 [6]

where: $Hg_o$ is elemental mercury.

Reaction [1] is suggested to occur in the hot NOMEX® membrane above its dew point, which may be considered a membrane downstream of a combustion chamber under normal operation.

Reactions [2] and [3] are suggested to occur in the cold NOMEX® membrane at or below its dew point, e.g. after furnace shutdown.

Reaction [4] is suggested to occur in the reheated hot NOMEX® membrane above its dew point, e.g. under normal operation of a combustion chamber.

Reaction [5] is suggested to occur in the reheated hot NOMEX® membrane in the absence of new injected $Cl_2$ in the presence of $Hg_O$.

Reaction [6] is suggested to occur in the reheated hot NOMEX® membrane in the presence of new injected $Cl_2$ in the presence of baghouse C—Cl—Hg—Hg.

The following examples are illustrative of the present invention. While Example 1 represents actual data, Examples 2-12 are prophetic.

Example 1

Figure 5:
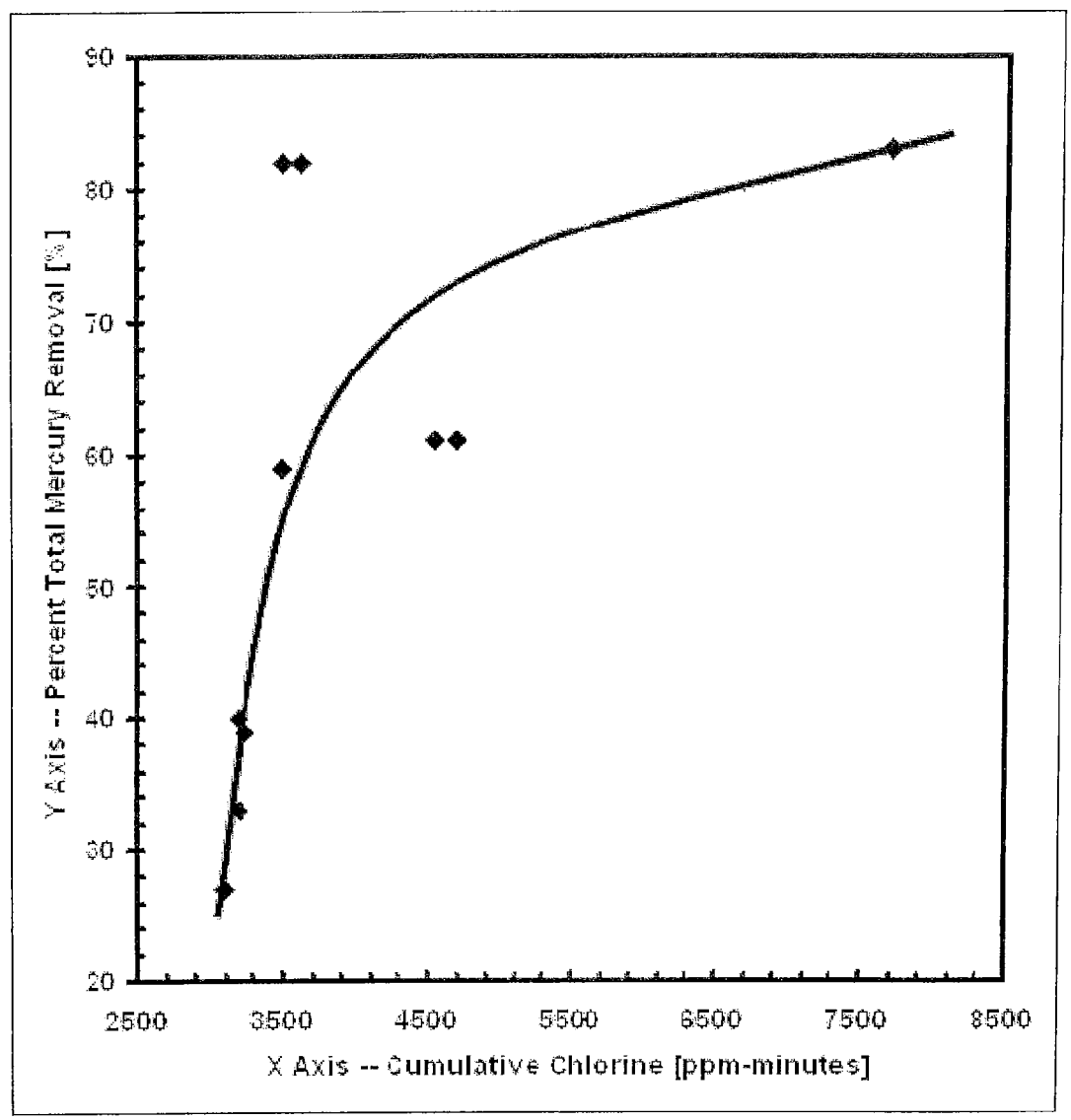
FIG. 5 is a graphical representation of the percent removal of total mercury in a flue gas (y axis) by a chlorinated polyamide membrane of the present inventions as a function of cumulative $Cl_2$ ppm-minutes (x axis).

A set of unhalogenated polyamide membranes were halogenated with molecular chlorine spiked flue gas during Wyodak subbituminous PRB (Powder River Basin) coal combustion. The membrane was allowed to cool through its dew point. The membrane absorbed up to 83% of mercury evolved from subbituminous coal combustion during the following day's coal combustion. Percent removal of total mercury in the flue gas (y axis) by a chlorinated polyamide (NOMEX®) membrane as a function of cumulative $Cl_2$ ppm-minutes (x axis) (ppm chlorine in flue gas * its dosing time in minutes) is shown in FIG. 5.

A variety of other techniques, methods and products are also predicted to perform equally as well as the teachings of Example 1. Some of those embodiments are depicted in the following prophetic examples.

Example 2

A pre-halogenated aromatic polyamide is synthesized by combining chlorinated monomers. The mercury-containing fluid is contacted with the polymer. Mercury removal is hypothesized to be similar to Example 1.

Example 3

A pre-halogenated aromatic polyamide is synthesized by combining brominated monomers. The mercury-containing fluid is contacted with the polymer. Mercury removal is hypothesized to be similar to Example 1, and potentially greater because bromine is generally a stronger or more rapid mercury-receptor than chlorine.

Example 4

A pre-halogenated aromatic polyamide is synthesized by combining iodinated monomers. The mercury-containing fluid is contacted with the polymer. Mercury removal is hypothesized to be similar to Example 1.

Example 5

An aromatic polyamide is halogenated through a chlorine solution. The mercury-containing fluid is contacted with the polymer. Mercury removal is hypothesized to be similar to Example 1.

Example 6

An aromatic polyamide is halogenated through a bromine gas or solution. The mercury-containing fluid is contacted with the polymer. Mercury removal is hypothesized to be similar to Example 1.

Example 7

An aromatic polyamide is halogenated through an iodine gas or solution. The mercury-containing fluid is contacted with the polymer. Mercury removal is hypothesized to be similar to Example 1.

Example 8

An aromatic polyamide is halogenated through a bromine spiked flue gas during coal combustion. The polyamide is allowed to cool through its due point. The mercury-containing fluid is contacted with the polymer. Mercury removal is hypothesized to be similar to Example 1.

Example 9

An aromatic polyamide is halogenated through an iodine spiked flue gas during coal combustion. The polyamide is allowed to cool through its due point. The mercury-containing fluid is contacted with the polymer. Mercury removal is hypothesized to be similar to Example 1.

Example 10

An unhalogenated polyamide filter is halogenated with molecular bromine spiked flue gas during coal combustion. The filter is allowed to cool through its dew point. The mercury containing fluid is contacted with the filter. Mercury removal is hypothesized to be similar to Experiment 1.

Example 11

An unhalogenated polyamide filter is halogenated with molecular iodine spiked flue gas during coal combustion. The filter is allowed to cool through its dew point. The mercury containing fluid is contacted with the filter. Mercury removal is hypothesized to be similar to Experiment 1.

Certain modifications and improvements will occur to those skilled in the art upon a reading of the foregoing description. It should be understood that all such modifications and improvements have been deleted herein for the sake of conciseness and readability but are properly within the scope of the following claims.

We claim:

1. A method for providing mercury collection in a combustion system, said method comprising the steps of:
    (a) burning a fuel containing mercury in a combustion chamber, whereby burning produces a flue gas stream containing mercury; and
    (b) removing mercury from the flue gas stream by contacting the flue gas stream with a thermopolymer, wherein said thermopolymer contains substitutions to increase conductivity.

2. A method of mercury-removal from a fluid, said method comprising the step of: contacting the fluid containing mercury with a polymer having a mercury-receptor, wherein said mercury-receptor was attached to said substrate by heating said substrate, exposing said substrate to said mercury-receptor, and cooling said substrate.

3. The method of claim 2, wherein the fluid is a flue gas.

4. The method of claim 3, wherein the fluid is a fossil fuel combustion flue gas.

5. The method of claim 2, wherein the fluid includes a vapor phase.

6. The method of claim 2, wherein the fluid includes a liquid phase.

7. The method of claim 6, wherein the liquid is water.

8. The method of claim 2, wherein the step of contacting includes passing the fluid through a membrane.

9. The method of claim 2, wherein the step of contacting includes injecting the polymer into the fluid.

10. The method of claim 9, wherein the polymer is a particle.

11. The method of claim 2, wherein the polymer is an aromatic polymer.

12. The method of claim 11, wherein the aromatic polymer is a polyamide.

13. The method of claim 11, wherein the aromatic polymer is a polysulfone.

14. The method of claim 2, wherein the mercury-receptor is a halogen.

15. The method of claim 14, wherein the halogen is selected from the group consisting of chlorine, bromine, and iodine.

16. The method of claim 2, wherein the polymer having a mercury-receptor is created by reacting a halogenated monomer with another monomer.

17. The method of claim 2, wherein the polymer having a mercury-receptor is created in situ by exposing the polymer to a gaseous mercury-receptor.

18. The method of claim 2 wherein the polymer having a mercury-receptor is created in situ by exposing the polymer to a mercury-receptor in solution.

19. The method of claim 2, wherein said polymer contains substitutions to increase conductivity.

20. A method for providing mercury collection in a combustion system, said method comprising the steps of:
    (a) burning a fuel containing mercury in a combustion chamber, whereby burning produces a flue gas stream containing mercury;

(b) removing mercury from the flue gas stream by contacting the flue gas stream with a device including: (i) a thermopolymer substrate; and (ii) a mercury-receptor attached to the substrate, wherein said mercury-receptor was attached to said substrate by heating said substrate, exposing said substrate to said mercury-receptor, and cooling said substrate; and (c) collecting the mercury attached to the thermopolymer.

21. A method of removing mercury from a fluid, said method comprising the steps of:
(a) heating a polymer membrane;
(b) exposing the heated membrane to a mercury-receptor;
(c) cooling the exposed polymer membrane; and
(d) contacting the polymer with a mercury containing fluid.

22. The method of claim 21, wherein the fluid is a gas.

23. The method of claim 22, wherein the gas is a combustion flue gas.

24. The method of claim 21, wherein the step of heating includes heating above the dew-point temperature of the membrane.

25. The method of claim 24, wherein the heating occurs downstream of a combustion zone.

26. The method of claim 21, wherein the step of exposing is achieved through a gas including a mercury-receptor.

27. The method of clam 26, wherein the gas including a mercury receptor includes chlorine gas.

28. The method of claim 26, wherein the gas including a mercury receptor includes a bromine gas.

29. The method of claim 21, wherein the step of exposing is achieved through a liquid including a mercury-receptor.

30. The method of claim 21, wherein the step of cooling includes cooling to below the dew-point temperature of the membrane.

31. The method of claim 30, wherein the step of contacting includes passing the fluid through a membrane.

32. A method for providing mercury collection in a combustion system, said method comprising the steps of:
burning a fuel containing mercury in a combustion chamber, whereby burning produces a flue gas stream containing mercury;
injecting a supply of gaseous monomers downstream from the beginning of the combustion chamber; and
removing mercury from the flue gas stream by contacting the flue gas stream with a thermopolymer formed from the gaseous monomers.

33. A method of removing mercury from a flue gas, said method comprising the steps of:
heating a polymer substrate above the dew-point temperature of the substrate;
exposing the heated substrate to at least one of a gas including a mercury-receptor and a liquid including a mercury-receptor;
cooling the exposed polymer substrate to below the dew-point temperature of the substrate; and
contacting the polymer substrate with the flue gas.

* * * * *